US007284057B2

(12) United States Patent
Kulkarni et al.

(10) Patent No.: US 7,284,057 B2
(45) Date of Patent: Oct. 16, 2007

(54) METHODS AND APPARATUS FOR MOBILE IP HOME AGENT CLUSTERING

(75) Inventors: Milind M. Kulkarni, San Jose, CA (US); Kent K. Leung, Mountain View, CA (US); Alpesh Patel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 847 days.

(21) Appl. No.: 10/084,698

(22) Filed: Feb. 27, 2002

(65) Prior Publication Data

US 2003/0182433 A1    Sep. 25, 2003

(51) Int. Cl.
G06F 15/16    (2006.01)
(52) U.S. Cl. .................... 709/227; 455/435.1
(58) Field of Classification Search ........ 709/227–228, 709/245, 223–224; 370/331; 455/435.1
See application file for complete search history.

(56) References Cited

U.S. PATENT DOCUMENTS

| | | |
|---|---|---|
| 4,692,918 A | 9/1987 | Elliott et al. |
| 5,016,244 A | 5/1991 | Massey et al. |
| 5,018,133 A | 5/1991 | Tsukakoshi et al. |
| 5,159,592 A | 10/1992 | Perkins |
| 5,218,600 A | 6/1993 | Schenkyr et al. |
| 5,371,852 A | 12/1994 | Attanasio et al. |
| 5,442,633 A | 8/1995 | Perkins et al. |
| 5,457,736 A | 10/1995 | Cain et al. |
| 5,473,599 A | 12/1995 | Li et al. |
| 5,572,528 A | 11/1996 | Shuen |

(Continued)

FOREIGN PATENT DOCUMENTS

EP    1058421    6/2000

(Continued)

OTHER PUBLICATIONS

Release notes for 3Com Corporation, "Conducting a Redundant Route for Network Resiliency," Mar. 1994, *NET Builder Family Bridge/Router* pp. 26-29.

(Continued)

*Primary Examiner*—Abdullahi Salad
(74) *Attorney, Agent, or Firm*—Beyer Weaver LLP

(57) ABSTRACT

Methods and apparatus for processing a registration request from a Mobile Node that has roamed to a Foreign Agent supporting Mobile IP are disclosed. In a first one of a plurality of Home Agents supporting Mobile IP, a registration request addressed to a virtual Home Agent address associated with the plurality of Home Agents is received. The registration request is then sent to a second one of the plurality of Home Agents such that the second one of the plurality of Home Agents creates a binding between the Mobile Node and the Foreign Agent. The first one of the plurality of Home Agents creates a temporary binding between the Mobile Node and the Foreign Agent. A registration reply is then received from the second one of the plurality of Home Agents. The temporary binding is then updated to create a permanent binding when the registration reply is received from the second one of the plurality of Home Agents. The registration reply is then sent to the Foreign Agent identified in the temporary binding.

58 Claims, 8 Drawing Sheets

U.S. PATENT DOCUMENTS

| | | | |
|---|---|---|---|
| 5,659,544 | A | 8/1997 | La Porta et al. |
| 5,793,762 | A | 8/1998 | Penners et al. |
| 5,901,352 | A | 5/1999 | St-Pierre et al. |
| 6,137,791 | A | 10/2000 | Frid et al. |
| 6,144,671 | A | 11/2000 | Perinpanathan et al. |
| 6,160,804 | A | 12/2000 | Ahmed et al. |
| 6,167,513 | A | 12/2000 | Inoue et al. |
| 6,195,705 | B1* | 2/2001 | Leung ..................... 709/245 |
| 6,407,988 | B1 | 6/2002 | Agraharam et al. |
| 6,421,714 | B1 | 7/2002 | Rai et al. |
| 6,567,664 | B1 | 5/2003 | Bergenwall et al. |
| 6,651,105 | B1 | 11/2003 | Bhagwat et al. |
| 6,707,809 | B1* | 3/2004 | Warrier et al. ............. 370/351 |
| 6,732,177 | B1 | 5/2004 | Roy |
| 6,771,623 | B2* | 8/2004 | Ton ........................ 370/331 |
| 6,795,705 | B1 | 9/2004 | Warrier et al. |
| 6,839,338 | B1 | 1/2005 | Amara et al. |
| 6,856,624 | B2* | 2/2005 | Magret ..................... 370/392 |
| 6,970,443 | B2 | 11/2005 | Dynarski et al. |
| 6,987,771 | B2* | 1/2006 | Shimizu et al. ............. 370/401 |
| 7,069,015 | B2* | 6/2006 | Veerepalli et al. .......... 455/453 |
| 2001/0012777 | A1 | 8/2001 | Igarashi et al. |
| 2001/0021175 | A1* | 9/2001 | Haverinen ................. 370/230 |
| 2002/0009066 | A1* | 1/2002 | Shimizu et al. ............. 370/338 |
| 2002/0026527 | A1 | 2/2002 | Das et al. |
| 2002/0039367 | A1 | 4/2002 | Seppala et al. |
| 2002/0065785 | A1 | 5/2002 | Tsuda |
| 2002/0080752 | A1* | 6/2002 | Johansson et al. .......... 370/338 |
| 2002/0114323 | A1 | 8/2002 | Chowdhury et al. |
| 2002/0114469 | A1 | 8/2002 | Faccin et al. |
| 2003/0016655 | A1 | 1/2003 | Gwon |
| 2003/0018810 | A1* | 1/2003 | Karagiannis et al. ....... 709/238 |
| 2003/0073439 | A1* | 4/2003 | Wenzel et al. ............. 455/435 |
| 2003/0147537 | A1 | 8/2003 | Jing et al. |
| 2004/0174876 | A1* | 9/2004 | Peirce et al. ............... 370/389 |
| 2004/0184420 | A1 | 9/2004 | Xu et al. |

FOREIGN PATENT DOCUMENTS

| | | |
|---|---|---|
| EP | 1134991 | 9/2001 |
| EP | 1134991 A2 | 9/2001 |
| WO | 01/06734 A2 | 1/2001 |

OTHER PUBLICATIONS

J. Moy, RFC 1247 "OSPF Version 2," Jul. 19, 1991.

D. Oran, RFC 1142 "OSI IS-IS Intra-domain Routing Protocol," Feb. 1990.

Uyless Black, "TCP/IP and Related Protocols," 1992, *McGraw-Hill, Inc.*, pp. 226-249.

T. Li, et al., RFC 2281 "Cisco Hot Standby Router Protocol (HSRP)," Mar. 1998.

Chambless, et al., "Home Agent Redundancy Protocol (HARP)," Oct. 27, 1997.

C. Perkins, "*IP Mobility Support*," RFC2002, IBM Corporation, Oct. 1996.

"*Mobile IP*," Release 12.0(1)T, pp. 1-55.

Montenegro, G., "*Reverse Tunneling for Mobile IP*," RFC 2344, Sun Microsystems, Inc., pp. 1-19, May 1998.

D. Harkins and D. Carrel, "*The Internet Key Exchange (IKE)*," Cisco Systems, pp. 1-33, Jun. 1998.

D. Cong and M. Hamlen, and C. Perkins, "*The Definitions of Managed Objects for IP Mobility Support using SM1v2*," RFC2006, Motorola and IBM, pp. 1-52, Oct. 1996.

Perkins and Calhoun, "Generalized Key Distribution Extensions for Mobile IP" draft-ietf-mobileip-gen-key-01.txt,, Mobile IP Working Group, Internet Draft, Aug. 27, 2001, 7 pages.

C. Finseth, "*An Access Control Protocol, Sometimes Called TACACS*," RFC1492, pp. 1-15, Sep. 13, 1992.

D. Carrel and Lol Grant, "*The TACACS+ Protocol*," Network Working Group, Internet-Draft, Cisco Systems, pp. 1-42, Jan. 1997.

C. Rigney, "*RADIUS Accounting*," RFC 2139, Livingston, pp. 1-25, Apr. 1997.

C. Rigney, et al., "*Remote Authentication Dial in User Service (RADIUS)*," RFC 2138, pp. 1-65 Apr. 1997.

Aboba and Beadles, "*The Network Access Identifier*" RFC 2486, Jan. 1999.

Calhoun and Perkins, "*Mobile IP Network Access Identifier Extension*", Jan. 12, 2000.

Postel, J., "*Simple Mail Transfer Protocol*", STD 10, RFC821, Aug. 1982.

Crocker, D. and P. Overrell, "*Augmented BNF For Syntax Specifications: ABNF*", RFC 2234, Nov. 1997.

Perkins c: "RFC 2002: IP Mobility Support", Request for Comments, Oct. 1996, XP002187650, Retrieved from the Internet:: URL:ftp://ftp.isi.edu/in-notes/rfc2002.txt, retrieved on Jan. 17, 2002, pp. 24-55.

Jue J.P. et al., "Design and Analysis of Replicated Servers to Support IP-Host Mobility in Enterprise Networks" Communications, 1997, ICC ''97 Montreal Towards the Knowledge Millennium, 1997, IEEE International Conference on Montreal, Que., Canada Jun. 8-12, 1997, New York, NY, USA, IEEE, US, Jun. 8, 1997, pp. 1256-1260, XP010226957.

International Search Report, Applications No. PCT/US03/02828, Mailed Sep. 5, 2003; 4 pages.

International First Office Action, Chinese Patent Application No. 03800009.1, Office Action was issued on Oct. 14, 2005. English translation attached. 10 pages (CISCP271.CN).

Examiner's Communication pursuant to Article 96(2) EPC dated Apr. 12, 2006, From corresponding European Patent Application No. 03715961.3, Methods and Apparatus for Mobile IP Home Agent Clustering. 7 Pages. (CISCP271.EP).

Hunt G.D.H. et al., "Network Dispatcher: a connection router for scalable Internet services" Computer Networks and ISDN Systems, North Holland Publishing. Amsterdam, NL, vol. 30, No. 1-7, Apr. 1, 1998, pp. 347-357, XP004121412 ISSN: 0169-7552.

International Search Report, Application No. PCT/US03/13926, Mailed Aug. 22, 2003 (CISCP287.WO).

\* cited by examiner

Pending (temporary) bindings 502

| MN_ID (e.g., IP address, NAI) | HAn (e.g., IP address) | FA address |
|---|---|---|
| | | |

Permanent bindings 510

| MN_ID (e.g., IP addr, NAI) | HAn (e.g., IP addr) | Reg. lifetime | FA address |
|---|---|---|---|
| | | | |

METHODS AND APPARATUS FOR MOBILE IP HOME AGENT CLUSTERING

BACKGROUND OF THE INVENTION

1. Field of the Invention

The present invention relates to Mobile IP network technology. More particularly, the present invention relates to enabling dynamic Home Agent assignment in Mobile IP using a cluster of Home Agents.

2. Description of the Related Art

Mobile IP is a protocol which allows laptop computers or other mobile computer units (referred to as "Mobile Nodes" herein) to roam between various sub-networks at various locations—while maintaining internet and/or WAN connectivity. Without Mobile IP or related protocol, a Mobile Node would be unable to stay connected while roaming through various sub-networks. This is because the IP address required for any node to communicate over the internet is location specific. Each IP address has a field that specifies the particular sub-network on which the node resides. If a user desires to take a computer which is normally attached to one node and roam with it so that it passes through different sub-networks, it cannot use its home base IP address. As a result, a business person traveling across the country cannot merely roam with his or her computer across geographically disparate network segments or wireless nodes while remaining connected over the internet. This is not an acceptable state-of-affairs in the age of portable computational devices.

To address this problem, the Mobile IP protocol has been developed and implemented. An implementation of Mobile IP is described in RFC 2002 of the IP Routing for Wireless/Mobile Hosts Working Group, C. Perkins, Ed., October 1996. Mobile IP is also described in the text "Mobile IP Unplugged" by J. Solomon, Prentice Hall. Both of these references are incorporated herein by reference in their entireties and for all purposes.

The Mobile IP process and environment are illustrated in FIG. 1. As shown there, a Mobile IP environment 2 includes the internet (or a WAN) 4 over which a Mobile Node 6 can communicated remotely via mediation by a Home Agent 8 and a Foreign Agent 10. Typically, the Home Agent and Foreign Agent are routers or other network connection devices performing appropriate Mobile IP functions as implemented by software, hardware, and/or firmware. A particular Mobile Node (e.g., a laptop computer) plugged into its home network segment connects with the internet through its designated Home Agent. When the Mobile Node roams, it communicates via the internet through an available Foreign Agent. Presumably, there are many Foreign Agents available at geographically disparate locations to allow wide spread internet connection via the Mobile IP protocol. Note that it is also possible for the Mobile Node to register directly with its Home Agent.

As shown in FIG. 1, Mobile Node 6 normally resides on (or is "based at") a network segment 12 which allows its network entities to communicate over the internet 4 through Home Agent 8 (an appropriately configured router denoted R2). Note that Home Agent 8 need not directly connect to the internet. For example, as shown in FIG. 1, it may be connected through another router (a router R1 in this case). Router R1 may, in turn, connect one or more other routers (e.g., a router R3) with the internet.

Now, suppose that Mobile Node 6 is removed from its home base network segment 12 and roams to a remote network segment 14. Network segment 14 may include various other nodes such as a PC 16. The nodes on network segment 14 communicate with the internet through a router which doubles as Foreign Agent 10. Mobile Node 6 may identify Foreign Agent 10 through various agent solicitations and agent advertisements which form part of the Mobile IP protocol. When Mobile Node 6 engages with network segment 14, it composes a registration request for the Home Agent 8 to bind the Mobile Node's current location with its home location. Foreign Agent 10 then relays the registration request to Home Agent 8 (as indicated by the dotted line "Registration"). During the registration process, the Home Agent and the Mobile Node 6 may then negotiate the conditions of the Mobile Node's attachment to Foreign Agent 10. For example, the Mobile Node 6 may request a registration lifetime of 5 hours, but the Home Agent 8 may grant only a 3 hour period. Therefore, the attachment may be limited to a period of time. When the negotiation is successfully completed, Home Agent 8 updates an internal "mobility binding table" which links the Mobile Node's current location via its care-of address (e.g., a collocated care-of address or the Foreign Agent's IP address) to the identity (e.g., home address) of Mobile Node 6. Further, if the Mobile Node 6 registered via a Foreign Agent, the Foreign Agent 10 updates an internal "visitor table" which specifies the Mobile Node address, Home Agent address, etc. In effect, the Mobile Node's home base IP address (associated with segment 12) has been binded to the care-of address such as the Foreign Agent's IP address (associated with segment 14).

Now, suppose that Mobile Node 6 wishes to send a message to a Correspondent Node 18 from its new location. An output message from the Mobile Node is then packetized and forwarded through Foreign Agent 10 over the internet 4 to Correspondent Node 18 (as indicated by the dotted line "packet from MN") according to a standard Internet Protocol. If Correspondent Node 18 wishes to send a message to Mobile Node—whether in reply to a message from the Mobile Node or for any other reason—it addresses that message to the IP address of Mobile Node 6 on sub-network 12. The packets of that message are then forwarded over the internet 4 and to router R1 and ultimately to Home Agent 8 as indicated by the dotted line ("packet to MN(1)"). From its mobility binding table, Home Agent 8 recognizes that Mobile Node 6 is no longer attached to network segment 12. It then encapsulates the packets from Correspondent Node 18 (which are addressed to Mobile Node 6 on network segment 12) according to a Mobile IP protocol and forwards these encapsulated packets to a "care of" address for Mobile Node 6 as shown by the dotted line ("packet to MN(2)"). The care-of address may be, for example, the IP address of Foreign Agent 10. Foreign Agent 10 then strips the encapsulation and forwards the message to Mobile Node 6 on sub-network 14. The packet forwarding mechanism implemented by the Home and Foreign Agents is often referred to as "tunneling."

As indicated above, each mobile node has a designated Home Agent. As specified in RFC 2002, a mobile node is pre-configured with information identifying its Home Agent. In addition, both the mobile node and its Home Agent are also pre-configured with a shared key and Security Parameter Index (SPI) for the shared key, commonly referred to as a security association. Similarly, each Home Agent is pre-configured with information identifying mobile nodes that it supports as well as the corresponding security associations. In this manner, a mobile node is "anchored" to a specific Home Agent to enable it to subsequently register with that Home Agent and receive messages via that Home Agent from Correspondent Nodes.

There are various disadvantages associated with the pre-assignment of a specific Home Agent to a mobile node. For instance, the mobile node may be a cell phone that has been activated on the West Coast, and will therefore be assigned a Home Agent on the West Coast. However, the user of that cell phone may wish to travel to the East Coast. Thus, when the mobile node roams to a Foreign Agent, that Foreign Agent will therefore be on the East Coast. Of course, the user will remain anchored to the Home Agent on the West Coast due to pre-configuration. In the case of a Correspondent Node sending packets to a mobile node, both located on the East Coast, traffic must still travel to the pre-assigned Home Agent on the West Coast for those packets to be tunneled to the mobile node. As a result, the communication path between the mobile node and the Correspondent Node, both located on the East Coast, is unnecessarily long. Accordingly, the pre-assignment of a Home Agent to a Mobile Node results in less than optimal performance.

Another disadvantage with pre-assignment of a specific Home Agent to each mobile node is the non-dynamic nature of such pre-assignments. As described above, each mobile node and Home Agent must be pre-configured with specific information anchoring each mobile node to a specific Home Agent. This requires the configuration information to be known ahead of time as well as manually configured for each device. Thus, even when there are multiple Home Agents on a single home network, since each Home Agent must be statically configured, it is impossible to dynamically distribute registration requests among the Home Agents. It would therefore be beneficial if a "lightly loaded" Home Agent could share the load of a "heavily loaded" Home Agent.

Currently, a single Home Agent (HA) can support up to approximately 500,000 bindings due to hardware and software restrictions. However, service providers have a large number of Mobile IP subscribers. A single service provider typically has millions of Mobile IP subscribers. Unfortunately, a single Home Agent cannot support this requirement. In order to solve this problem, multiple Home Agents are often used. However, even when multiple Home Agents are implemented, the Mobile Nodes must each be configured with a single Home Agent address. In other words, the Mobile Nodes are configured with separate HA addresses. This solution therefore requires a great deal of administrative support and does not scale with the increase in Mobile IP subscribers that are likely in the near future.

In view of the above, it would be desirable if a more scalable solution could be developed which would enable Mobile IP subscribers to be supported by multiple Home Agents. More specifically, it would be beneficial if multiple Home Agents could be used to simultaneously support multiple Mobile Nodes without requiring the Mobile Nodes to be configured with a specific Home Agent address.

SUMMARY OF THE INVENTION

The present invention supports Home Agent clustering. This is accomplished through intercepting and routing registration requests and replies via a main Home Agent in a plurality of Home Agents, referred to as a Home Agent cluster controller (HACC). In this manner Mobile IP subscribers may be supported by multiple Home Agents, rather than a single, statically configured Home Agent.

In accordance with one aspect of the invention, a first one of the plurality of Home Agents, referred to as the HACC, receives a registration request addressed to a virtual Home Agent address associated with the plurality of Home Agents. The registration request is then sent to a second one of the plurality of Home Agents such that the second one of the plurality of Home Agents creates a binding between the Mobile Node and the Foreign Agent. The first one of the plurality of Home Agents creates a temporary binding between the Mobile Node and the Foreign Agent. A registration reply is then received from the second one of the plurality of Home Agents. The temporary binding is then updated to create a permanent binding when the registration reply is received from the second one of the plurality of Home Agents. The registration reply is then sent to the Foreign Agent identified in the temporary binding.

In accordance with another aspect of the invention, the HACC may select one of the clustered Home Agents prior to forwarding a registration request. This selection process may be based upon load information and/or health information associated with the Home Agents in the Home Agent cluster. In this manner, registration requests may be distributed such that the most efficient and reliable service is provided to the Mobile IP subscribers.

In accordance with another aspect of the invention, the Mobile Nodes are configured with the virtual Home Agent address as their Home Agent, as well as configured as residing on a virtual network. Similarly, the plurality of Home Agents are configured with a virtual Home Agent address, which is advertised on the virtual network.

In accordance with yet another aspect of the invention, the HACC monitors the health of the Home Agents in the Home Agent cluster. When it determines that one of the Home Agents is not functioning, it sends bindings for the failed Home Agent to another Home Agent, such as a backup Home Agent. For instance, the bindings that are sent may include both permanent and temporary bindings. Similarly, the HACC may also periodically transmit all bindings (e.g., temporary and permanent) maintained by it to a backup that may operate in the event of its own failure.

In accordance with yet another aspect of the invention, the HACC intercepts data packets sent from a Mobile Node to a Corresponding Node. However, a Corresponding Node may send packets directly to the Mobile Node without intervention by the HACC.

Various network devices may be configured or adapted for intercepting, generating, modifying, and transmitting packets to implement the disclosed functionality. These network devices include, but are not limited to, servers (e.g., hosts), routers, and switches. Moreover, the functionality for the above-mentioned virtualization processes may be implemented in software as well as hardware.

Yet another aspect of the invention pertains to computer program products including machine-readable media on which are provided program instructions for implementing the methods and techniques described above, in whole or in part. Any of the methods of this invention may be represented, in whole or in part, as program instructions that can be provided on such machine-readable media. In addition, the invention pertains to various combinations and arrangements of data generated and/or used as described herein. For example, packets having the format described herein and provided on appropriate media are part of this invention.

These and other features of the present invention will be described in more detail below in the detailed description of the invention and in conjunction with the following figures.

BRIEF DESCRIPTION OF THE DRAWINGS

FIG. 5A is a diagram illustrating an exemplary table storing temporary, pending bindings in accordance with various embodiments of the invention.

FIG. 5B is a diagram illustrating an exemplary table storing permanent bindings in accordance with various embodiments of the invention.

DETAILED DESCRIPTION OF THE PREFERRED EMBODIMENTS

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to unnecessarily obscure the present invention.

Figure 1:
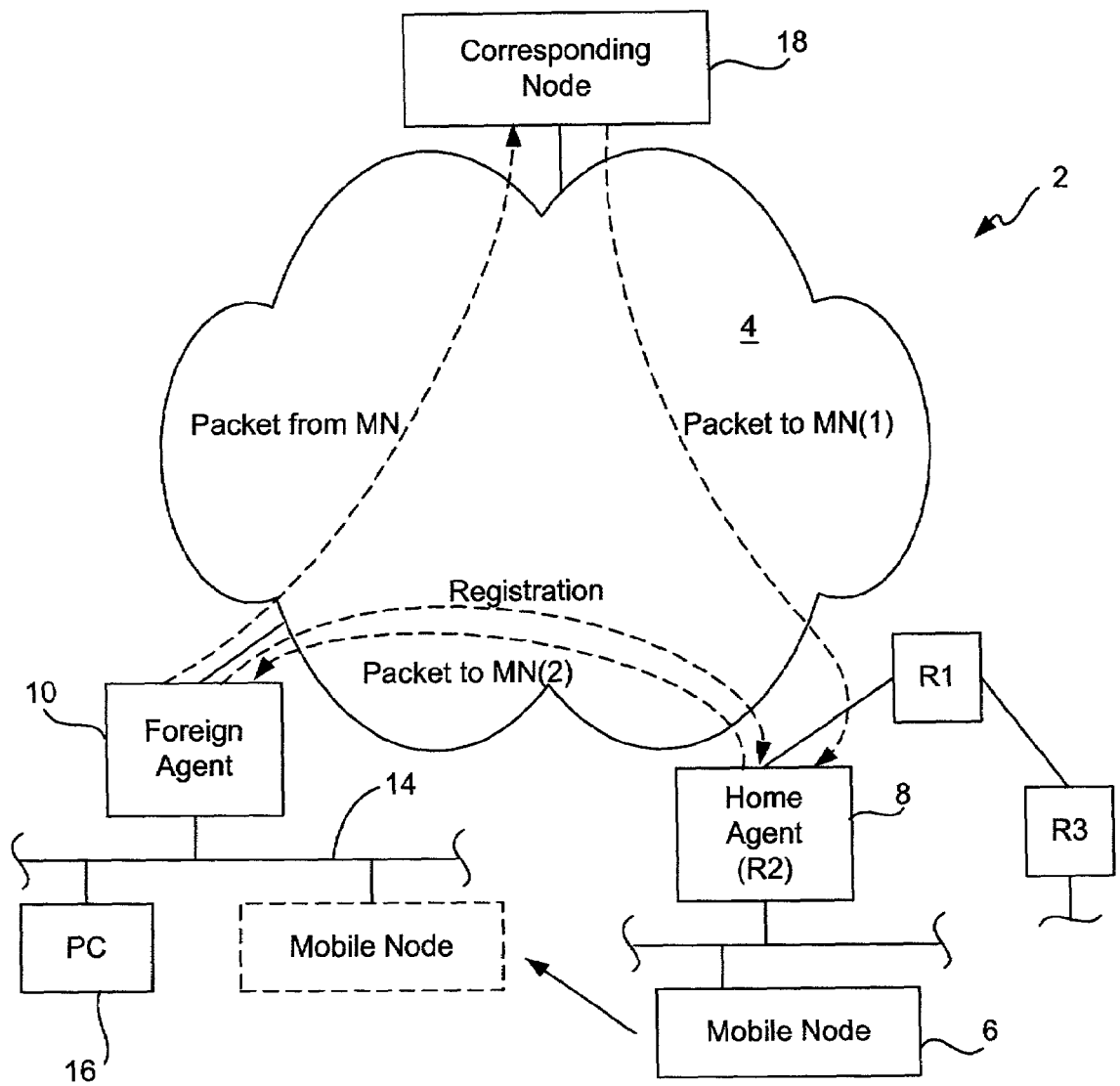
FIG. 1 is a diagram of a Mobile IP network segment and associated environment.
Figure 2:
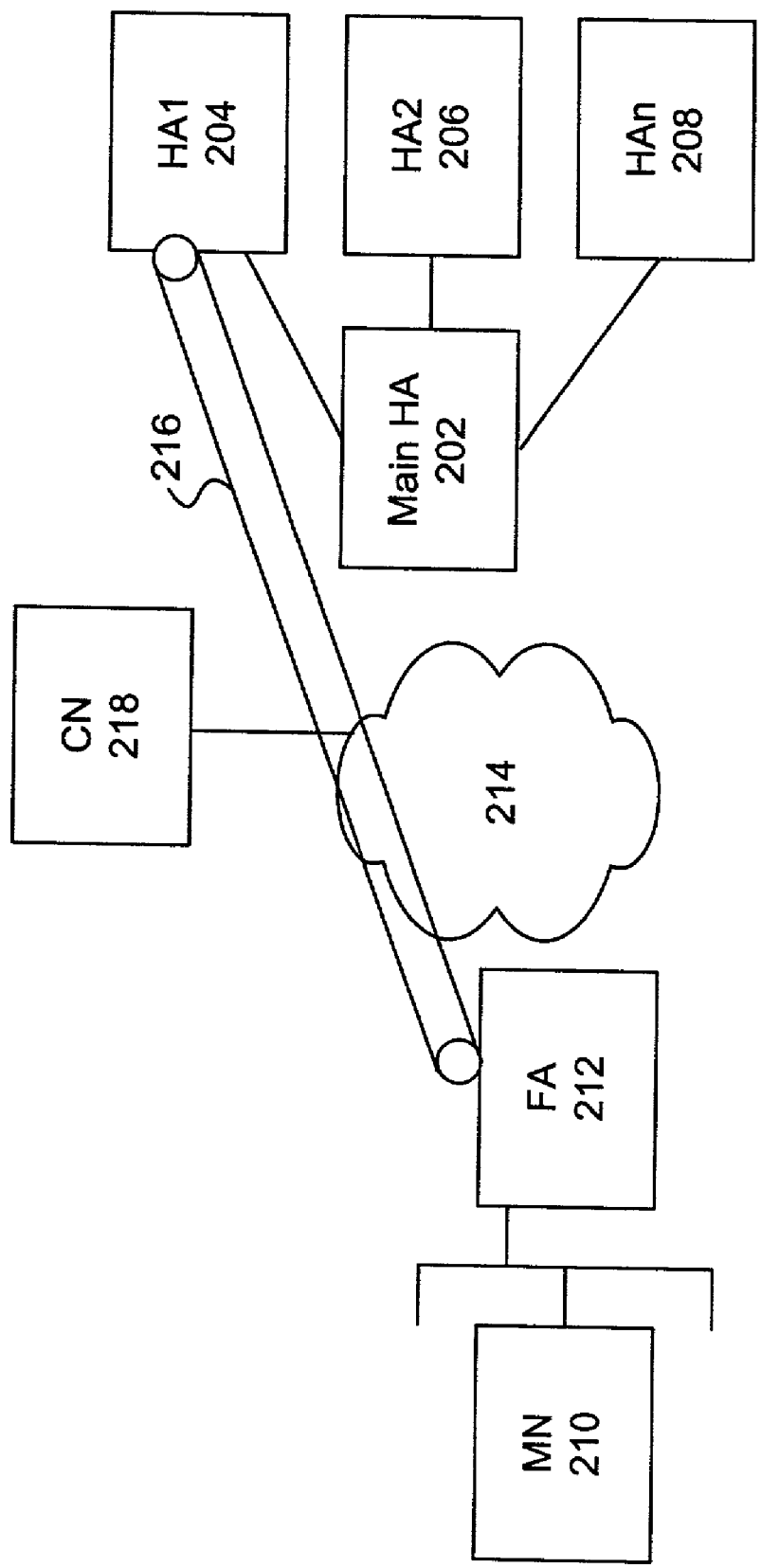
FIG. 2 is a block diagram illustrating an exemplary system in which the present invention may be implemented.

FIG. 2 is a block diagram illustrating an exemplary system in which the present invention may be implemented. The present invention enables Home Agent clustering to be implemented. As shown, a main Home Agent 202, serves as a Home Agent cluster controller for a cluster of Home Agents including one or more Home Agents. In this example, the cluster includes a first Home Agent HA1 204, second Home Agent HA2 206, and additional Home Agent HAn 208. Thus, the cluster includes n Home Agents. More particularly, the main Home Agent 202 (i.e., primary Home Agent) serves as an intermediary to forward registration requests to the appropriate Home Agent. This is accomplished by configuring the main Home Agent 202 and the cluster of Home Agents 204-208 with a virtual IP address that is also configured on the Mobile Node. When the Mobile Node 210 roams to a Foreign Agent 212, the Foreign Agent 212 forwards the registration request via the Internet 214 to the primary Home Agent 202. The primary Home Agent 202 determines whether a binding exists for the Mobile Node. If the binding exists, the Home Agent is identified. Otherwise, a Home Agent is selected. In this example, the Home Agent that is selected is HA1 204.

In accordance with a preferred embodiment, the primary Home Agent 202 and the clustered Home Agents 204-208 are layer 2 adjacent. In other words, the primary Home Agent 202 and the clustered Home Agents 204-208 are directly connected to the same subnet and share a common Internet medium. Thus, there are no hops (e.g., routers) separating the primary Home Agent 202 from the clustered Home Agents 204-208.

When a registration request is forwarded to a Home Agent in the Home Agent cluster, a temporary binding is preferably created until the Mobile Node is registered with that Home Agent. More particularly, the primary Home Agent may use this temporary binding to ascertain the Foreign Agent to which to forward a registration reply. In addition, if a subsequent registration request is received from the Mobile Node, the primary Home Agent 202 may ascertain that a previous registration request from the Mobile Node 210 is already pending, thereby preventing the sending of multiple registration requests to the same Home Agent. The temporary bindings may also be used to provide backup redundancy during a transition period. More specifically, if a registration request is pending and a registration reply has not yet been received, the binding will be temporary rather than permanent. During that period of time, the temporary binding may be used to ensure that incoming data traffic is sent to the appropriate Home Agent. The receiving Home Agent may then determine whether to process the data traffic.

When the primary Home Agent 202 receives a registration reply from the Home Agent, it updates the temporary binding to create a permanent binding. For instance, the registration lifetime provided in the registration reply is maintained in the permanent binding. In this manner, the primary Home Agent may ascertain when the registration with the Home Agent has expired.

Figure 3:
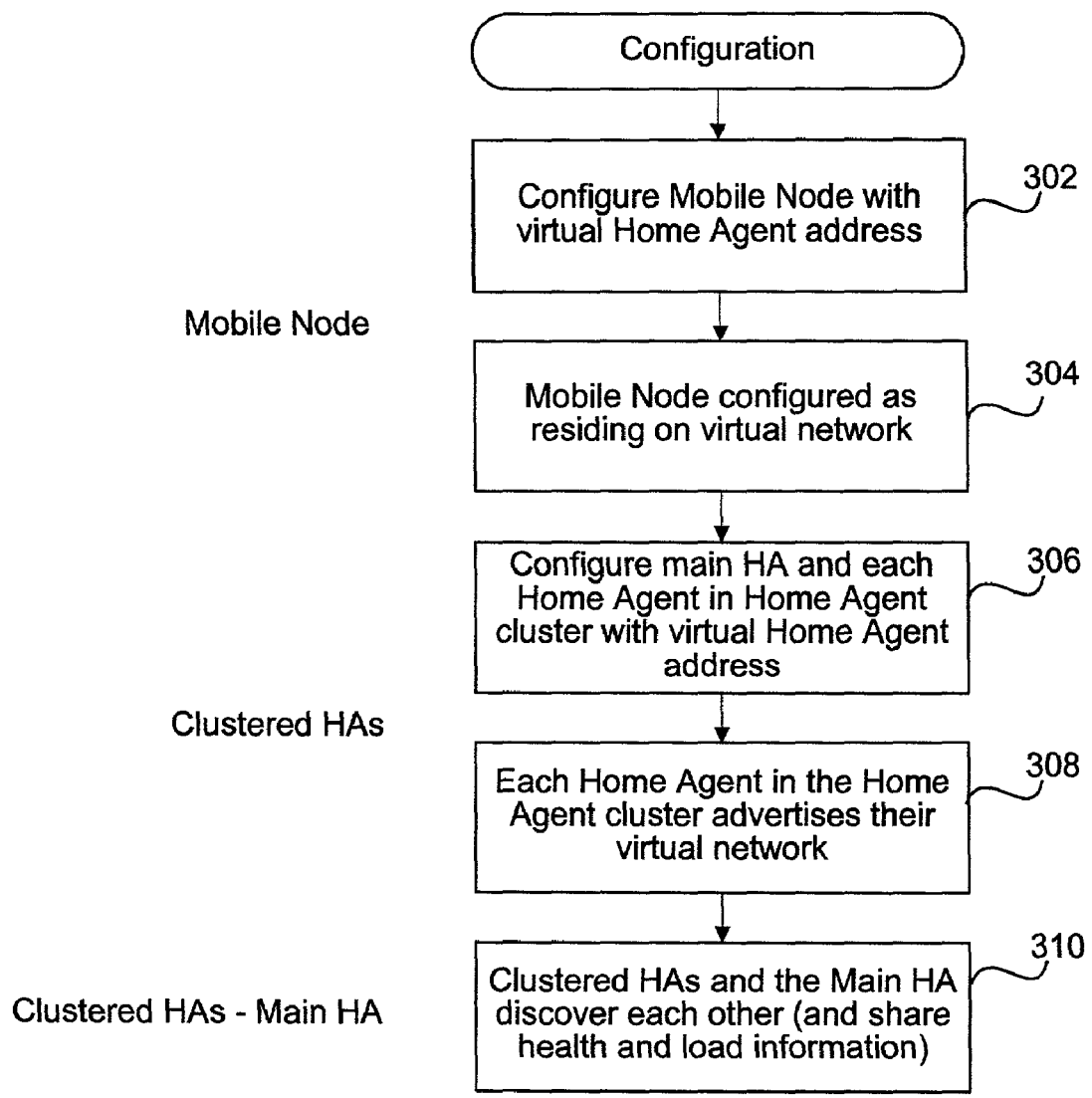
FIG. 3 is a process flow diagram illustrating a method of configuring the Mobile Node and the Home Agents in accordance with various embodiments of the invention.

FIG. 3 is a process flow diagram illustrating a method of configuring the Mobile Node and the Home Agents in accordance with various embodiments of the invention. As described above, the Mobile Node and the clustered Home Agents are configured with the virtual Home Agent address that is also associated with the primary Home Agent. Thus, the Mobile Node is configured with the virtual Home Agent address at block 302. In addition, in order to enable the Mobile Node to reside on its "home network" associated with the virtual Home Agent address, the Mobile Node is configured as residing on the virtual network associated with the virtual Home Agent address at block 304. Configuration on a virtual network may be performed using operating system commands using an Internetwork Operating System (IOS), available from Cisco Systems, located in San Jose, Calif. Each Home Agent in the Home Agent cluster and the primary Home Agent are configured with the virtual Home Agent address at block 306. The clustered Home Agents and the primary Home Agent may then advertise a virtual network associated with the virtual Home Agent address at block 308 by sending routing table updates, advertisements, or other messages. The clustered Home Agents and the primary Home Agent may then discover each other at block 310, as well as share health and load information. The health and load information may be provided in the agent advertisement as well as separately via a discovery protocol such as Cisco Discovery Protocol (CDP), available from Cisco Systems, Inc.

Figure 4:
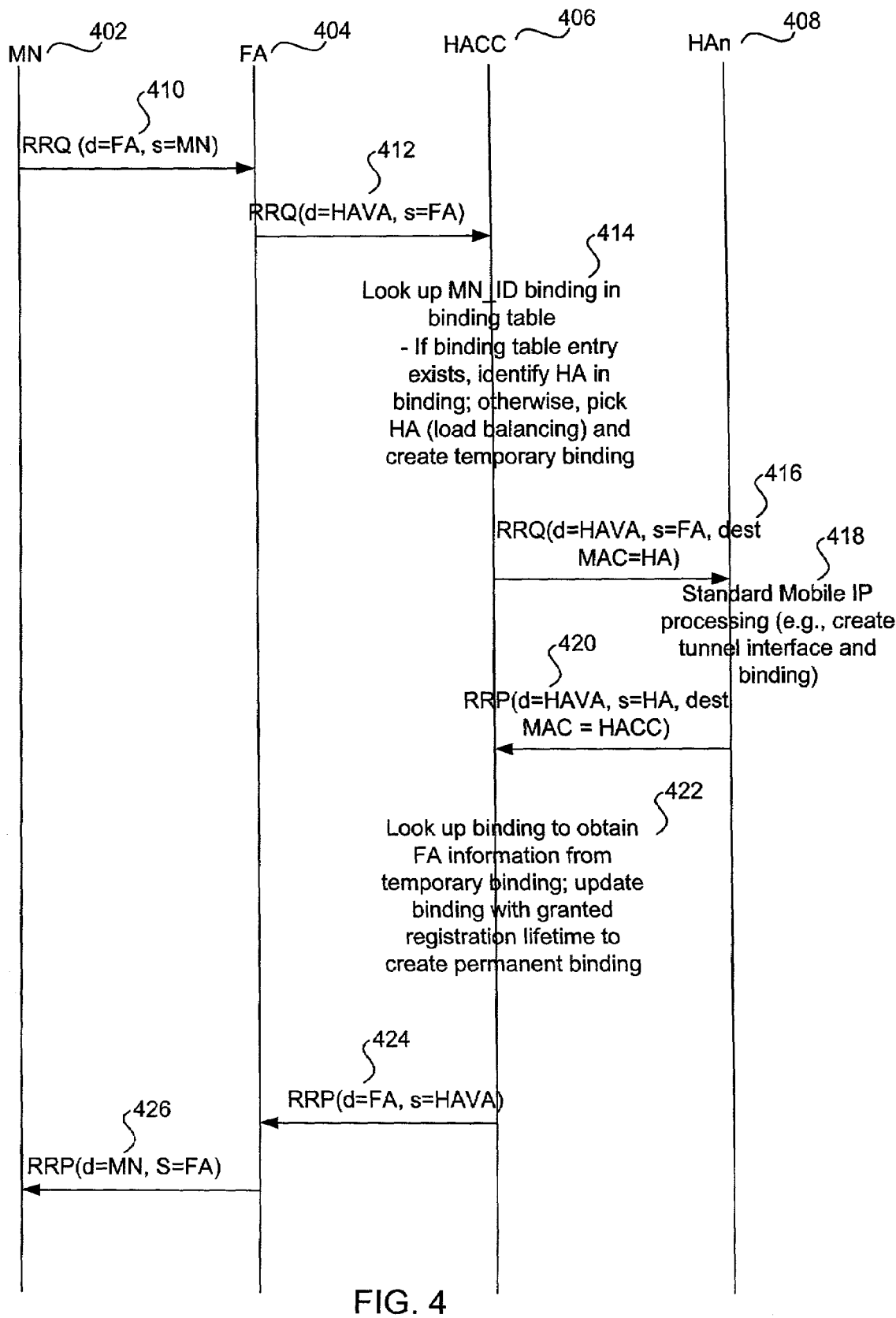
FIG. 4 is a control flow diagram illustrating a method of processing a registration request in accordance with various embodiments of the invention.

FIG. 4 is a control flow diagram illustrating a method of processing a registration request in accordance with various embodiments of the invention. Steps performed by the Mobile Node, Foreign Agent, primary Home Agent, and clustered Home Agent are represented by corresponding vertical lines 402, 404, 406, and 408, respectively. The Mobile Node 402 sends a registration request at 410 to the Foreign Agent 410. The registration request specifies the IP source address as the IP address of the Mobile Node and the destination IP address as the IP address of the Foreign Agent.

Since the Mobile Node is configured with the virtual Home Agent address as its Home Agent, the registration request specifies the virtual Home Agent address as the Home Agent field of the registration request. Alternatively, rather than configuring the Mobile Node with the virtual Home Agent address, the virtual Home Agent address may be configured at the Foreign Agent or otherwise obtained by the Foreign Agent. For instance, the Foreign Agent may obtain the virtual Home Agent address from a AAA server. The term AAA server will be used to refer to a server that can provide authorization and accounting services as well as authentication services.

Various protocols such as the Remote Authentication Dial In User Service (RADIUS) and TACACS+ may be implemented to implement a AAA server. In addition, this protocol may similarly be implemented on each Foreign Agent that communicates with the server. RFC 2138 describes the RADIUS Protocol and is hereby incorporated by reference. Similarly, RFC 1492 describes TACACS and the Internet-Draft "The TACACS+ Protocol Version 1.78," available at http://www.ietf.org/internet-drafts/draft-grant-tacacs-02.txt, describes TACACS+. Both of these documents are incorporated herein by reference for all purposes. RADIUS and TACACS+ conventionally provide authentication, authorization, and accounting services. Thus, these protocols are well suited for the servers of the present invention. However, the invention is not limited to these protocols. Other authentication, authorization, and accounting protocols may be used.

When the Foreign Agent 404 receives the registration request, it forwards the registration request to the virtual Home Agent address at 412. As shown, the registration request specifies the IP source address as the IP address of the Foreign Agent and the destination IP address as the virtual Home Agent address. The virtual Home Agent address may be implemented in a variety of ways, such as through the use of a loopback address.

When the primary Home Agent (i.e., Home Agent cluster controller) receives the registration request addressed to a virtual Home Agent address associated with a plurality of Home Agents, it operates as the cluster controller for the remaining Home Agents in the "cluster" of Home Agents. More specifically, it determines which Home Agent should receive and process the registration request. For instance, as shown at 414, the Home Agent cluster controller (HACC) searches a mobility binding table for a binding for the Mobile Node. If a binding for the Mobile Node exists, the HACC identifies the Home Agent from the binding prior to sending the registration request to that Home Agent. However, if a binding for the Mobile Node does not exist, the HACC selects one of the Home Agents in the Home Agent cluster to which to send the registration request. In order to determine whether a binding exists for the Mobile Node, the HACC may search a list of pending bindings as well as a list of permanent bindings for a Mobile Node identifier (e.g., IP address). Exemplary temporary bindings and permanent bindings will be described in further detail below with reference to FIGS. 5A and 5B.

In addition to sending the registration request, the HACC also creates a temporary binding between the Mobile Node and the Foreign Agent. This enables, the HACC to identify the Foreign Agent which is to receive the registration reply once it is received from the responsible Home Agent. In addition, the temporary binding may also identify the Home Agent that is to receive and process the registration request. Thus, the temporary binding may include an identifier associated with the Mobile Node, an IP address associated with the Foreign Agent, and an IP address associated with the subsequent one of the plurality of Home Agents to receive and process the registration request.

The HACC then sends the registration request to the "clustered" Home Agent such that the clustered Home Agent creates a binding between the Mobile Node and the Foreign Agent as shown at 416. As shown, the registration request specifies a destination MAC address as a MAC address assigned to the clustered Home Agent, a source IP address equal to the IP address of the Foreign Agent, and a destination IP address as the virtual Home Agent address. Once the clustered Home Agent receives the registration request, it processes the registration request according to RFC 2002 as shown at 418. For instance, it creates a tunnel interface and creates a binding for the Mobile Node. It then sends a registration reply to the HACC at 420. As shown, the registration reply specifies a destination MAC address as a MAC address assigned to the HACC, a destination IP address as the virtual Home Agent address, and a source IP address of the clustered Home Agent.

Once the HACC receives the registration reply, it updates the temporary binding to create a permanent binding at 422. For instance, the HACC may look up the temporary binding to identify the Foreign Agent prior to sending the registration reply to the Foreign Agent. For instance, the permanent binding may include information from the temporary binding as well as include further information, such as a registration lifetime which is obtained from the registration reply previously received from the clustered HA.

The HACC then sends the registration reply to the Foreign Agent at 424, which specifies a destination IP address of the Foreign Agent and a source IP address equal to the Home Agent virtual address. The Foreign Agent then forwards the registration reply to the Mobile Node at 426, where the registration reply specifies the source IP address of the Foreign Agent and the destination IP address of the Mobile Node.

As described above with reference to FIG. 4, the HACC may store temporary bindings as well as permanent bindings. These bindings may be stored together in a single mobility binding table. Alternatively, the temporary bindings may be stored in a mobility binding table separate from the permanent bindings, as will be described in further detail below with reference to FIG. 5A and FIG. 5B.

FIG. 5A is a diagram illustrating an exemplary mobility binding table storing temporary, pending bindings in accordance with various embodiments of the invention. A table storing pending, temporary bindings 502 includes one or more pending bindings associated with pending registration requests sent to the clustered Home Agent. More specifically, each entry identifies the Mobile Node with a Mobile Node identifier 504 such as an IP address. One standardized method for identifying users is proposed in RFC 2486 of the Network Working Group, January 1999, hereby incorporated by reference, which proposes syntax for the Network Access Identifier (NAI), the userID submitted by a client during Point to Point Protocol (PPP) authentication. Thus, when a client is authenticated based upon the NAI, an IP address may be allocated for use by the client. Accordingly, a pending (i.e., temporary) binding entry may include the NAI instead of, or in addition to, the IP address. In addition, an entry may further include a clustered Home Agent IP address 506, and a Foreign Agent IP address 508. Through specification of a Foreign Agent IP address in each entry, it is possible to identify the Foreign Agent the Mobile Node is visiting, thereby enabling the HACC to forward the registration reply to the Foreign Agent.

FIG. 5B is a diagram illustrating an exemplary mobility binding table storing permanent bindings in accordance with various embodiments of the invention. As shown, a table storing permanent bindings 510 includes one or more entries. Each entry includes a Mobile Node identifier 512 (e.g., IP address and/or NAI), Home Agent IP address 514, and Foreign Agent address 516 from the temporary binding. For instance, a temporary binding that includes an NAI may be updated with an IP address. In addition, a permanent binding further specifies a registration lifetime 518. More specifically, the clustered HA provides a granted registration lifetime in the registration reply, as described above with reference to FIG. 4. The HACC may then obtain this registration lifetime from the registration reply. In this manner, the HACC may monitor when the registration of the Mobile Node with the clustered HA has expired.

Figure 6:
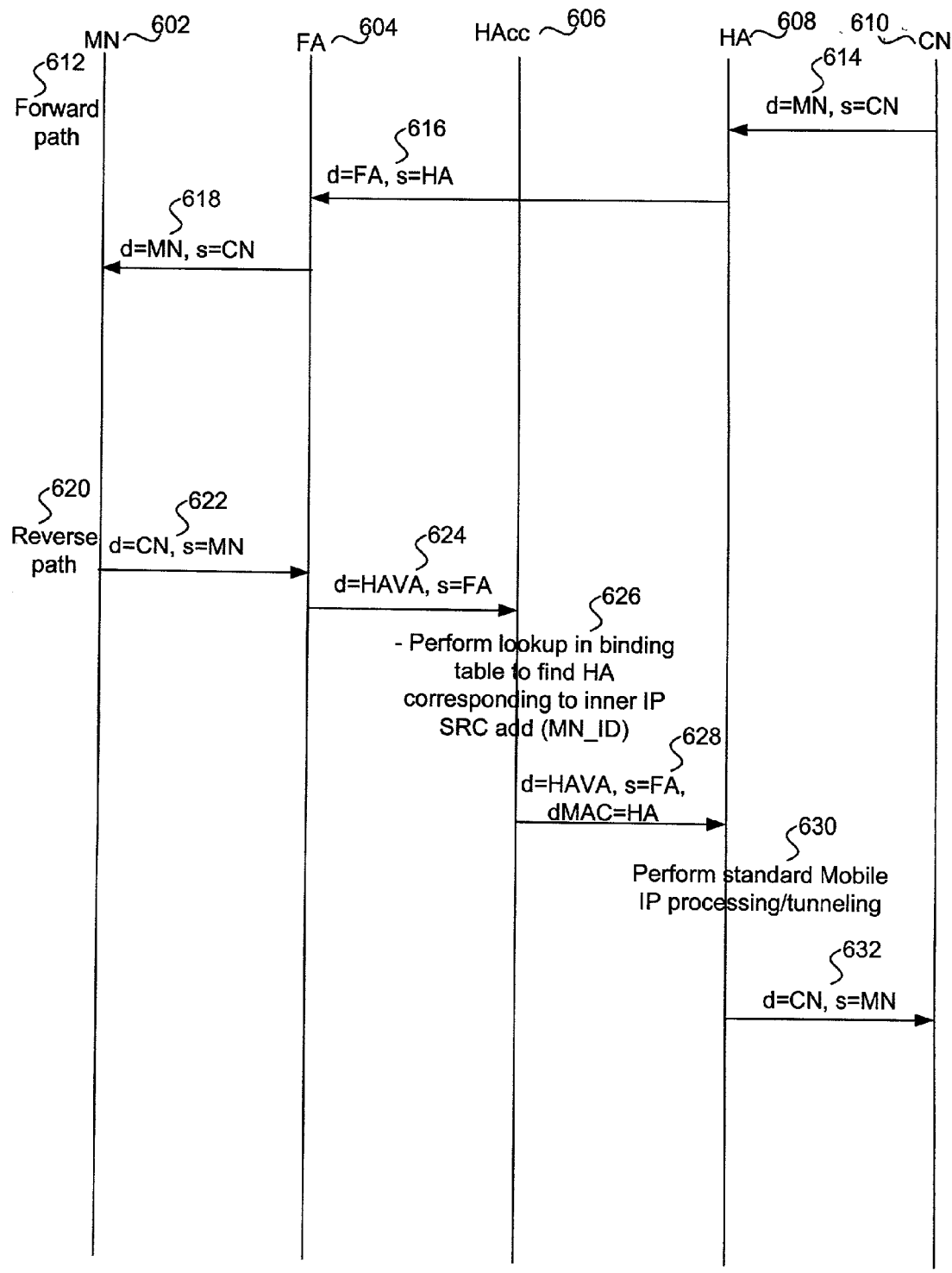
FIG. 6 is a data flow diagram illustrating a method of transmitting a data packet between a Mobile Node and a Corresponding Node in accordance with various embodiments of the invention.

Once the permanent binding has been established by the HACC and the clustered HA has created a binding for the Mobile Node, the Mobile Node and the Corresponding Node may send data packets to one another. FIG. 6 is a data flow diagram illustrating a method of transmitting a data packet between a Mobile Node and a Corresponding Node in accordance with various embodiments of the invention. Processes performed by the Mobile Node, Foreign Agent, HACC, clustered HA, and Corresponding Node are represented by vertical lines 602, 604, 606, 608, and 610, respectively. Data sent by a Corresponding Node to the Mobile Node is represented by forward path 612. More specifically, the Corresponding Node sends a data packet addressed to the Mobile Node at 614, which is received by the Home Agent. The Home Agent then tunnels the packet at 616 to the Foreign Agent. The Foreign Agent forwards the packet to the Mobile Node at 618.

Similarly, the Mobile Node sends a data packet to the Corresponding Node via reverse path 620. As shown, the Mobile Node sends a data packet to the Corresponding Node via the Foreign Agent at 622. The Foreign Agent sends the data packet to the virtual Home Agent IP address at 624, which is received by the HACC. The HACC then performs a lookup in the mobility binding table to determine which clustered HA has processed the registration request at 626. More specifically, the HACC looks up the Mobile Node identifier to obtain the appropriate entry in the mobility binding table.

For instance, in one embodiment, the HACC looks up the inner IP packet to find the source IP address of the inner IP packet, which identifies the Mobile Node. It then looks up the source IP address in the permanent binding table to find the entry corresponding to the Mobile Node. The Home Agent corresponding to the Mobile Node may then be identified from the entry. The HACC need not perform tunnel decapsulation even though the packet is destined to it.

Once the appropriate HA is identified, the HACC forwards the data packet to the destination MAC address of the clustered HA at 628. As shown, the destination IP address is still the virtual Home Agent address. The HA performs standard Mobile IP processing according to RFC 2002 at 630 and forwards the data packet to the Corresponding Node at 632.

Figure 7:
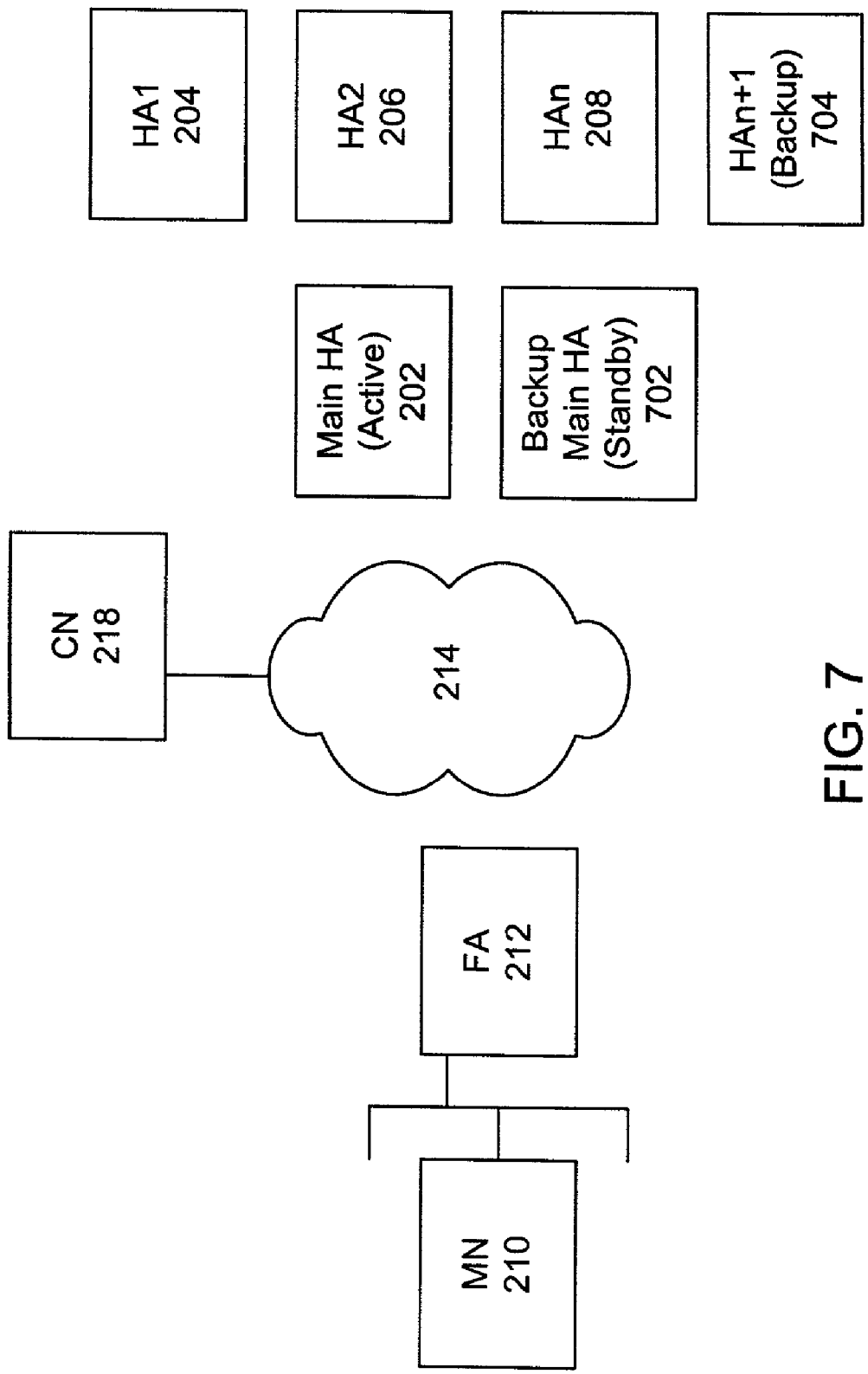
FIG. 7 is a diagram illustrating an exemplary system providing Home Agent redundancy in accordance with various embodiments of the invention.

FIG. 7 is a diagram illustrating an exemplary system providing Home Agent redundancy in accordance with various embodiments of the invention. In accordance with the embodiments described above, one or more backup Home Agents may support the main HA 202 (i.e., HACC) and the clustered HAs HA1 204 through HAn 208. More specifically, in this example, one or more backup HAs 702 support the main HA 202 through a redundancy protocol such as Hot Standby Router Protocol (HSRP), and therefore the backup HA 702 may be in standby mode while the main HA 202 may be in active mode. Similarly, one or more backup HAs 704 support the clustered HAs 204 through 208. In this example, the main HA 202 is supported separately from the clustered HAs 204 through 208 by two separate groups of backup Home Agents. However, the main HA 202 and clustered HAs 204 through 208 may also be supported by the same group of backup Home Agents.

As described above with reference to block 310 of FIG. 3, the clustered HAs and main HA discover each other, as well as share health and/or load information with one another. The health and load information may be provided separately or together in an agent advertisement as well as via a discovery protocol such as Cisco Discovery Protocol (CDP), available from Cisco Systems, Inc. Thus, the health and load information may be simultaneously transmitted to one or more Home Agents.

As described above with reference to FIG. 4, the HACC maintains bindings for each registration request that is processed. As a result, the HACC has a copy of bindings maintained by each clustered HA. Thus, the HACC may distribute bindings for a failing or failed clustered HA to a backup HA that can take over for the failing or failed HA. More specifically, the main HA 202 may determine from the health information that it receives when one of the clustered Has 204 through 208 is non-functional. It then sends a set of bindings to a backup Home Agent such as backup HA 704, which is also associated with the virtual Home Agent address. In addition, the main HA 202 also updates the same set of bindings maintained by the main HA 202 such that these bindings are associated with the backup Home Agent (rather than the failed Home Agent). This may be accomplished by associating one or more Mobile Nodes with an IP address of the backup Home Agent. Similarly, the HACC 202 may also periodically send bindings maintained by it to one or more backup Home Agents such as backup Main HA 702 that can take over for the HACC 202 in the event of its failure. More specifically, these bindings will be those bindings associated with each Home Agent in the Home Agent cluster managed by the HACC.

The main HA 202 may also select the backup Home Agent 704 from a plurality of backup Home Agents. More particularly, the main HA 202 may examine load information of the plurality of backup Home Agents prior to selecting the backup Home Agent. For instance, the load information may include the number of bindings currently supported, percentage of CPU utilization, and/or percentage of free memory.

OTHER EMBODIMENTS

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, a router or a switch. Such network devices may have multiple network interfaces including frame relay and ISDN interfaces, for example. Specific examples of such network devices include routers and switches. For example, the Home Agents of this invention may be implemented in specially configured routers or servers such as specially configured router models 1600, 2500, 2600, 3600, 4500, 4700, 7200, 7500, and 12000 available from Cisco Systems, Inc. of San Jose, Calif. A general architecture for some of these machines will appear from the description given below. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Figure 8:
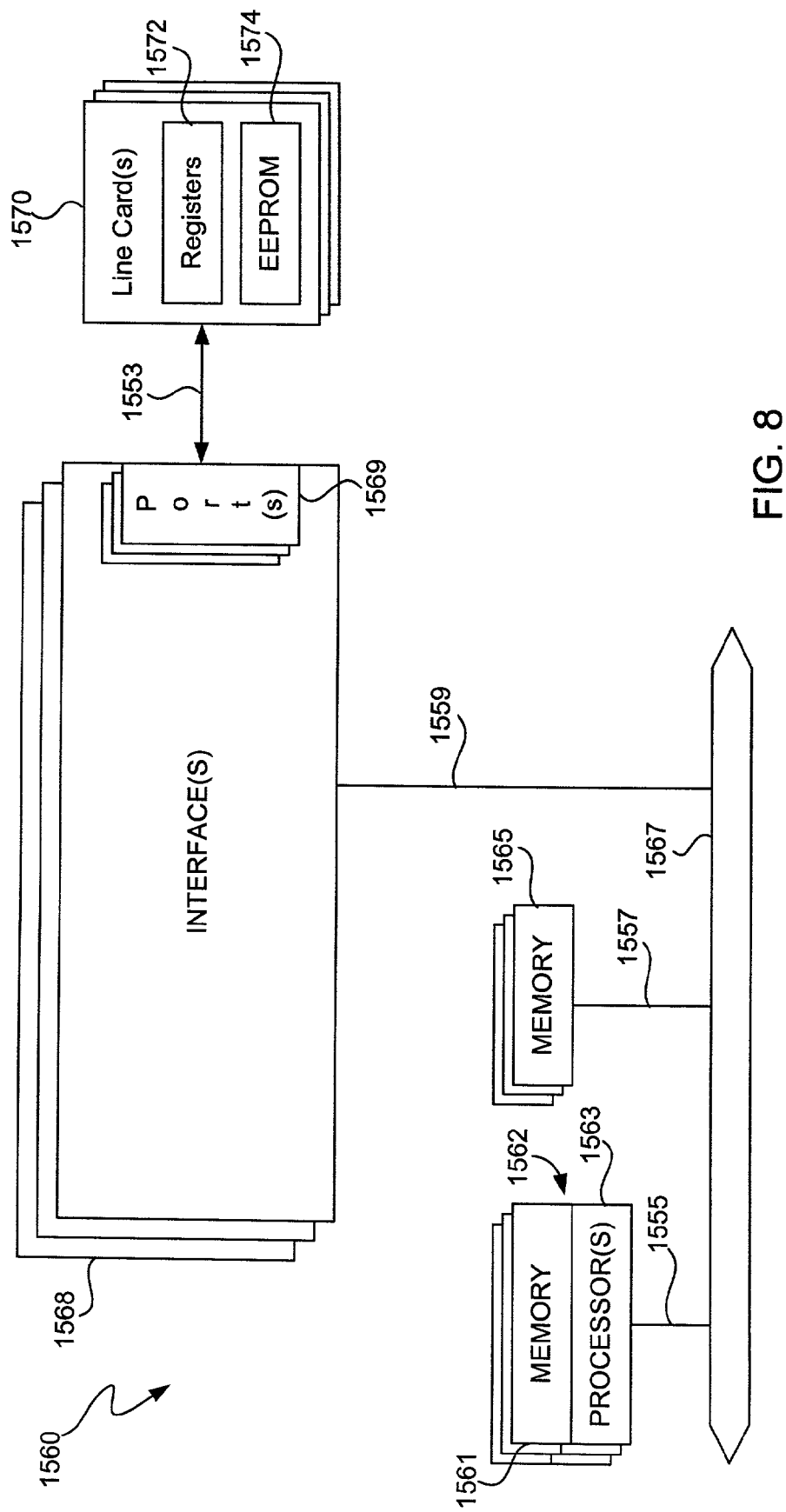
FIG. 8 is a diagram illustrating an exemplary network device in which embodiments of the invention may be implemented.

Referring now to FIG. 8, a network device 1560 suitable for implementing the techniques of the present invention includes a master central processing unit (CPU) 1562, interfaces 1568, and a bus 1567 (e.g., a PCI bus). When acting under the control of appropriate software or firmware, the CPU 1562 may be responsible for implementing specific functions associated with the functions of a desired network device. For example, when configured as an intermediate router, the CPU 1562 may be responsible for analyzing packets, encapsulating packets, and forwarding packets for transmission to a set-top box. The CPU 1562 preferably accomplishes all these functions under the control of software including an operating system (e.g. Windows NT), and any appropriate applications software.

CPU 1562 may include one or more processors 1563 such as a processor from the Motorola family of microprocessors or the MIPS family of microprocessors. In an alternative embodiment, processor 1563 is specially designed hardware for controlling the operations of network device 1560. In a specific embodiment, a memory 1561 (such as non-volatile RAM and/or ROM) also forms part of CPU 1562. However, there are many different ways in which memory could be coupled to the system. Memory block 1561 may be used for a variety of purposes such as, for example, caching and/or storing data, programming instructions, etc.

The interfaces 1568 are typically provided as interface cards (sometimes referred to as "line cards"). Generally, they control the sending and receiving of data packets over the network and sometimes support other peripherals used with the network device 1560. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, ASI interfaces, DHEI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 1562 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 1565) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave travelling over an appropriate medium such as airwaves, optical lines, electric lines, etc. Examples of program instructions include both machine code, such as produced by a compiler, and files containing higher level code that may be executed by the computer using an interpreter.

Although illustrative embodiments and applications of this invention are shown and described herein, many variations and modifications are possible which remain within the concept, scope, and spirit of the invention, and these variations would become clear to those of ordinary skill in the art after perusal of this application. For instance, the present invention is described as being implemented to enable a mobile node to be dynamically assigned a Home Agent based upon its health and/or load information. However, it should be understood that the invention is not limited to such implementations, but instead would equally apply regardless of the context and system in which it is implemented. Thus, broadly speaking, the operations described above may be used to enable dynamic assignment with respect to other mobility agents, such as Foreign Agents. In addition, the above-described invention may be stored on a disk drive, a hard drive, a floppy disk, a server computer, or a remotely networked computer. Accordingly, the present embodiments are to be considered as illustrative and not restrictive, and the invention is not to be limited to the details given herein, but may be modified within the scope and equivalents of the appended claims.

What is claimed is:

1. In a first one of a plurality of Home Agents supporting Mobile IP, a method of processing a registration request from a Mobile Node that has roamed to a Foreign Agent supporting Mobile IP, comprising:

receiving a registration request addressed to a virtual Home Agent address associated with the plurality of Home Agents;

sending the registration request to a second one of the plurality of Home Agents such that the second one of the plurality of Home Agents creates a binding between the Mobile Node and the Foreign Agent;

creating a temporary binding by the first one of the plurality of Home Agents between the Mobile Node and the Foreign Agent;

receiving a registration reply from the second one of the plurality of Home Agents;

updating the temporary binding by the first one of the plurality of Home Agents to create a permanent binding when the registration reply is received from the second one of the plurality of Home Agents; and sending the registration reply to the Foreign Agent identified in the temporary binding.

2. The method as recited in claim 1, wherein the temporary binding comprises an identifier associated with the Mobile Node, an IP address associated with the Foreign Agent, and an IP address associated with the second one of the plurality of Home Agents.

3. The method as recited in claim 1, wherein the permanent binding comprises an identifier associated with the Mobile Node, an IP address associated with the Foreign Agent, an IP address associated with the second one of the plurality of Home Agents, and a registration lifetime.

4. The method as recited in claim 3, wherein the identifier is an IP address.

5. The method as recited in claim 4, wherein the permanent binding further comprises an NAI associated with the Mobile Node.

6. The method as recited in claim 3, further comprising:
obtaining the registration lifetime from the registration reply received from the second one of the plurality of Home Agents.

7. The method as recited in claim 1, wherein updating the temporary binding to create a permanent binding comprises:
specifying a granted registration lifetime obtained from the registration reply received from the second one of the plurality of Home Agents.

8. The method as recited in claim 7, wherein updating the temporary binding to create a permanent binding comprises:
specifying an IP address assigned to the Mobile Node by the second one of the plurality of Home Agents.

9. The method as recited in claim 1, further comprising:
obtaining the temporary binding; and
identifying the Foreign Agent from the temporary binding prior to sending the registration reply to the Foreign Agent.

10. The method as recited in claim 1, wherein the registration request specifies a destination MAC address equal to a MAC address assigned to the second one of the plurality of Home Agents.

11. The method as recited in claim 1, wherein the registration reply specifies a destination MAC address equal to a MAC address assigned to the first one of the plurality of Home Agents.

12. The method as recited in claim 1, wherein the registration request specifies a destination IP address as the virtual Home Agent address.

13. The method as recited in claim 1, wherein the registration reply specifies a destination IP address as the virtual Home Agent address.

14. The method as recited in claim 1, wherein the registration request specifies a destination IP address as the virtual Home Agent address and the registration reply specifies a destination IP address as the virtual Home Agent address.

15. The method as recited in claim 1, further comprising:
advertising a virtual network associated with the virtual Home Agent address.

16. The method as recited in claim 15, wherein advertising comprises sending a routing table update.

17. The method as recited in claim 1, further comprising:
sending at least one of Home Agent health and load information associated with the first one of the plurality of Home Agents to one or more of the plurality of Home Agents.

18. The method as recited in claim 15, further comprising:
receiving an advertisement from one of the plurality of Home Agents, the advertisement advertising the virtual network associated with the virtual Home Agent address.

19. The method as recited in claim 18, wherein receiving an advertisement from one of the plurality of Home Agents comprises:
receiving one or more routing table updates advertising the virtual network associated with the virtual Home Agent address.

20. The method as recited in claim 18, further comprising:
receiving at least one of Home Agent health and load information associated with the one of the plurality of Home Agents.

21. The method as recited in claim 1, further comprising:
receiving at least one of Home Agent health and load information associated with one of the plurality of Home Agents.

22. The method as recited in claim 21, further comprising:
determining from the Home Agent health information whether the one of the plurality of Home Agents is functioning; and
when the one of the plurality of Home Agents is not functioning, sending a set of Mobile Node bindings to a backup Home Agent associated with the virtual Home Agent address and updating one or more bindings such that the one or more bindings are associated with the backup Home Agent.

23. The method as recited in claim 22, wherein updating one or more bindings such that the one or more bindings are associated with the backup Home Agent comprises:
associating one or more Mobile Nodes with an IP address of the backup Home Agent.

24. The method as recited in claim 22, further comprising:
selecting the backup Home Agent from a plurality of backup Home Agents.

25. The method as recited in claim 24, further comprising:
examining load information of the plurality of backup Home Agents prior to selecting the backup Home Agent.

26. The method as recited in claim 1, further comprising:
sending one or more bindings to one or more backup Home Agents, the one or more bindings being associated with one or more of the plurality of Home Agents.

27. The method as recited in claim 26, wherein sending one or more bindings comprises:
sending one or more temporary bindings and one or more permanent bindings to the one or more backup Home Agents.

28. The method as recited in claim 1, further comprising:
when the registration request is received, searching for a binding for the Mobile Node;
when a binding for the Mobile Node exists, identifying the second one of the plurality of Home Agents in the binding prior to sending the registration request to the second one of the plurality of Home Agents; and
when a binding for the Mobile Node does not exist, selecting the second one of the plurality of Home Agents prior to sending the registration request to the second one of the plurality of Home Agents.

29. A first one of a plurality of Home Agents supporting Mobile IP, the first one of the plurality of Home Agents being adapted for processing a registration request from a Mobile Node that has roamed to a Foreign Agent supporting Mobile IP, comprising:
- means for receiving a registration request addressed to a virtual Home Agent address associated with the plurality of Home Agents;
- means for sending the registration request to a second one of the plurality of Home Agents such that the second one of the plurality of Home Agents creates a binding between the Mobile Node and the Foreign Agent;
- means for creating a temporary binding by the first one of the plurality of Home Agents between the Mobile Node and the Foreign Agent;
- means for receiving a registration reply from the second one of the plurality of Home Agents;
- means for updating the temporary binding by the first one of the plurality of Home Agents to create a permanent binding when the registration reply is received from the second one of the plurality of Home Agents; and
- means for sending the registration reply to the Foreign Agent identified in the temporary binding.

30. A first one of a plurality of Home Agents supporting Mobile IP, the first one of the plurality of Home Agents being adapted for processing a registration request from a Mobile Node that has roamed to a Foreign Agent supporting Mobile IP, comprising:
- a processor; and
- a memory, at least one of the processor and the memory being adapted for:
- receiving a registration request addressed to a virtual Home Agent address associated with the plurality of Home Agents;
- sending the registration request to a second one of the plurality of Home Agents such that the second one of the plurality of Home Agents creates a binding between the Mobile Node and the Foreign Agent;
- creating a temporary binding by the first one of the plurality of Home Agents between the Mobile Node and the Foreign Agent;
- receiving a registration reply from the second one of the plurality of Home Agents;
- updating the temporary binding by the first one of the plurality of Home Agents to create a permanent binding when the registration reply is received from the second one of the plurality of Home Agents; and
- sending the registration reply to the Foreign Agent identified in the temporary binding.

31. The first one of a plurality of Home Agents as recited in claim 30, wherein the temporary binding comprises an identifier associated with the Mobile Node, an IP address associated with the Foreign Agent, and an IP address associated with the second one of the plurality of Home Agents.

32. The first one of a plurality of Home Agents as recited in claim 30, wherein the permanent binding comprises an identifier associated with the Mobile Node, an IP address associated with the Foreign Agent, an IP address associated with the second one of the plurality of Home Agents, and a registration lifetime.

33. The first one of a plurality of Home Agents as recited in claim 32, wherein the identifier is an IP address.

34. The first one of a plurality of Home Agents as recited in claim 33, wherein the permanent binding further comprises an NAI associated with the Mobile Node.

35. The first one of a plurality of Home Agents as recited in claim 32, at least one of the processor and the memory being further adapted for:
- obtaining the registration lifetime from the registration reply received from the second one of the plurality of Home Agents.

36. The first one of a plurality of Home Agents as recited in claim 30, wherein updating the temporary binding to create a permanent binding comprises:
- specifying a granted registration lifetime obtained from the registration reply received from the second one of the plurality of Home Agents.

37. The first one of a plurality of Home Agents as recited in claim 36, wherein updating the temporary binding to create a permanent binding comprises:
- specifying an IP address assigned to the Mobile Node by the second one of the plurality of Home Agents.

38. The first one of a plurality of Home Agents as recited in claim 30, at least one of the processor and the memory being further adapted for:
- obtaining the temporary binding; and
- identifying the Foreign Agent from the temporary binding prior to sending the registration reply to the Foreign Agent.

39. The first one of a plurality of Home Agents as recited in claim 30, wherein the registration request specifies a destination MAC address equal to a MAC address assigned to the second one of the plurality of Home Agents.

40. The first one of a plurality of Home Agents as recited in claim 30, wherein the registration reply specifies a destination MAC address equal to a MAC address assigned to the first one of the plurality of Home Agents.

41. The first one of a plurality of Home Agents as recited in claim 30, wherein the registration request specifies a destination IP address as the virtual Home Agent address.

42. The first one of a plurality of Home Agents as recited in claim 30, wherein the registration reply specifies a destination IP address as the virtual Home Agent address.

43. The first one of a plurality of Home Agents as recited in claim 30, wherein the registration request specifies a destination IP address as the virtual Home Agent address and the registration reply specifies a destination IP address as the virtual Home Agent address.

44. The first one of a plurality of Home Agents as recited in claim 30, at least one of the processor and the memory being further adapted for:
- advertising a virtual network associated with the virtual Home Agent address.

45. The first one of a plurality of Home Agents as recited in claim 44, wherein advertising comprises sending a routing table update.

46. The first one of a plurality of Home Agents as recited in claim 30, at least one of the processor and the memory being further adapted for:
- sending at least one of Home Agent health and load information associated with the first one of the plurality of Home Agents to one or more of the plurality of Home Agents.

47. The first one of a plurality of Home Agents as recited in claim 44, at least one of the processor and the memory being further adapted for:
- receiving an advertisement from one of the plurality of Home Agents, the advertisement advertising the virtual network associated with the virtual Home Agent address.

48. The first one of a plurality of Home Agents as recited in claim 47, wherein receiving an advertisement from one of the plurality of Home Agents comprises:
  receiving one or more routing table updates advertising the virtual network associated with the virtual Home Agent address.

49. The first one of a plurality of Home Agents as recited in claim 47, at least one of the processor and the memory being further adapted for:
  receiving at least one of Home Agent health and load information associated with the one of the plurality of Home Agents.

50. The first one of a plurality of Home Agents as recited in claim 30, at least one of the processor and the memory being further adapted for:
  receiving at least one of Home Agent health and load information associated with one of the plurality of Home Agents.

51. The first one of a plurality of Home Agents as recited in claim 50, at least one of the processor and the memory being further adapted for:
  determining from the Home Agent health information whether the one of the plurality of Home Agents is functioning; and
  when the one of the plurality of Home Agents is not functioning, sending a set of Mobile Node bindings to a backup Home Agent associated with the virtual Home Agent address and updating one or more bindings such that the one or more bindings are associated with the backup Home Agent.

52. The first one of a plurality of Home Agents as recited in claim 51, wherein updating one or more bindings such that the one or more bindings are associated with the backup Home Agent comprises:
  associating one or more Mobile Nodes with an IP address of the backup Home Agent.

53. The first one of a plurality of Home Agent as recited in claim 51, at least one of the processor and the memory being further adapted for:
  selecting the backup Home Agent from a plurality of backup Home Agents.

54. The first one of a plurality of Home Agents as recited in claim 53, at least one of the processor and the memory being further adapted for:
  examining load information of the plurality of backup Home Agents prior to selecting the backup Home Agent.

55. The first one of a plurality of Home Agents as recited in claim 30, at least one of the processor and the memory being further adapted for:
  sending one or more bindings to one or more backup Home Agents, the one or more bindings being associated with one or more of the plurality of Home Agents.

56. The first one of a plurality of Home Agents as recited in claim 55, wherein sending one or more bindings comprises:
  sending one or more temporary bindings and one or more permanent bindings to the one or more backup Home Agents.

57. The first one of a plurality of Home Agents as recited in claim 30, at least one of the processor and the memory being further adapted for:
  when the registration request is received, searching for a binding for the Mobile Node;
  when a binding for the Mobile Node exists, identifying the second one of the plurality of Home Agents in the binding prior to sending the registration request to the second one of the plurality of Home Agents; and
  when a binding for the Mobile Node does not exist, selecting the second one of the plurality of Home Agents prior to sending the registration request to the second one of the plurality of Home Agents.

58. A computer-readable medium storing thereon computer-readable instructions for processing a registration request from a Mobile Node that has roamed to a Foreign Agent supporting Mobile IP in a first one of a plurality of Home Agents supporting Mobile IP, comprising:
  instructions for receiving a registration request addressed to a virtual Home Agent address associated with the plurality of Home Agents;
  instructions for sending the registration request to a second one of the plurality of Home Agents such that the second one of the plurality of Home Agents creates a binding between the Mobile Node and the Foreign Agent;
  instructions for creating a temporary binding by the first one of the plurality of Home Agents between the Mobile Node and the Foreign Agent;
  instructions for receiving a registration reply from the second one of the plurality of Home Agents;
  instructions for updating the temporary binding by the first one of the plurality of Home Agents to create a permanent binding when the registration reply is received from the second one of the plurality of Home Agents; and
  instructions for sending the registration reply to the Foreign Agent identified in the temporary binding.

* * * * *